United States Patent
Kim

(10) Patent No.: US 6,366,077 B1
(45) Date of Patent: Apr. 2, 2002

(54) APPARATUS AND METHOD FOR DETECTING THE RATE OF ROTATION OF DC SPINDLE MOTOR

(75) Inventor: Young-han Kim, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/519,418

(22) Filed: Mar. 6, 2000

(30) Foreign Application Priority Data

Sep. 7, 1999 (KR) .............................. 99-37905

(51) Int. Cl.[7] .................................. G01P 3/46
(52) U.S. Cl. ...................... 324/177; 318/560
(58) Field of Search ................... 324/177, 207.25; 318/362, 363, 364, 373, 374, 317, 590, 594, 560, 772

(56) References Cited

U.S. PATENT DOCUMENTS

| | | | | |
|---|---|---|---|---|
| 4,608,613 A | * | 8/1986 | Mayake | .................. 360/78 |
| 4,825,137 A | * | 4/1989 | Nakajima et al. | ............ 318/594 |
| 5,796,697 A | * | 8/1998 | Masaki et al. | ............. 369/75.2 |
| 6,046,559 A | * | 4/2000 | Iwasaki | ..................... 318/364 |

FOREIGN PATENT DOCUMENTS

| | | |
|---|---|---|
| KR | 1994-27285 | 12/1994 |
| KR | 1999-32201 | 5/1999 |

* cited by examiner

*Primary Examiner*—Jay Patidar
*Assistant Examiner*—Subhash Zaveri
(74) *Attorney, Agent, or Firm*—Staas & Halsey LLP

(57) ABSTRACT

An apparatus and method for detecting a rate of rotation of a DC spindle motor without using an additional frequency generation (FG) signal generator in electronic equipment using the DC spindle motor. The apparatus detects the rate of rotation of a DC motor based on a current applied to the DC motor without using an additional FG signal generator in electronic equipment employing the DC motor and performs control corresponding to a detected result, thereby lowering costs and improving a manufacturing process in comparison with a conventional method employing a brushless motor to detect the rate of rotation of a motor.

34 Claims, 3 Drawing Sheets

APPARATUS AND METHOD FOR DETECTING THE RATE OF ROTATION OF DC SPINDLE MOTOR

CROSS-REFERENCE TO RELATED APPLICATIONS

This application claims the benefit of Korean Application No. 99-37905, filed Sep. 7, 1999, in the Korean Patent Office, the disclosure of which is incorporated herein by reference.

BACKGROUND OF THE INVENTION

1. Field of the Invention

The present invention relates to an apparatus and method for detecting the rate of rotation of a motor, and more particularly, to an apparatus and method for detecting the rate of rotation of a DC spindle motor without using an additional frequency generation (FG) signal generator in electronic equipment using the DC spindle motor.

2. Description of the Related Art

Electronic equipment such as DVDPs, CDPs and VCRs employing a spindle motor generally use a brushless motor. FIG. 1 shows the configuration of a general disk drive. In a disk driver employing a constant linear velocity (CLV) recording method, the rate of rotation of a disk continuously varies from about 500 rpm (at the innermost circumference) to about 200 rpm (at the outermost circumference) according to the reproduction position of a pickup.

Referring to FIG. 1, a CLV servo block 104 applies a voltage for rotating a disk 101 at a preset initial speed to a spindle motor 102 via a driver 103. Thus, the disk 101 begins to rotate, and information recorded on the disk 101 is converted into an analog radio frequency (RF) signal by a pickup 105. The converted analog RF signal is output to a signal processing block 106. Then, the signal processing block 106 converts the analog RF signal into a pulse waveform and outputs the pulse waveform to the CLV servo block 104.

In the CLV servo block 104, a digital phase-locked loop (PLL) circuit generates a bit clock which is synchronized with a reproduction signal. Thereafter, the bit clock is compared with a system clock in an automatic frequency control (AFC) detection circuit and a phase comparing circuit to output a control voltage to the driver 103. In other words, when a bit clock frequency is lower than a system clock frequency, the voltage applied to the spindle motor 102 is increased to increase the rate of rotation. On the other hand, when the bit clock frequency is higher than the system clock frequency, the voltage is decreased to decrease the rate of rotation.

When the bit clock frequency is equal to the system clock frequency through such control, the disk reproduction speed becomes equal to a linear velocity for recording, so that the data on the disk can be reproduced within a range of the linear velocity adapted for recording.

A tracking and focusing (T/F) servo block 107 is for servo tracking and focusing. In other words, the T/F servo block 107 creates en electrical signal corresponding to a beam tracing state and moves an object lens and a body of the pickup 105 in a radial direction of the disk 101 based on the created electrical signal, thereby carrying out the servo tracking for controlling a beam to trace a track. In addition, the T/F servo block 107 employs an astigmatism method and a critical angle detecting method to carry out the focusing servo for controlling the pickup 105 such that the object lens is focused on the reflective surface of the disk 101.

When switching from one surface of the disk 101 to the other surface of the disk 101 during reproduction (such as the pickup 105 moving to the other side of the disk 101), a voltage for accelerating the disk 101 in a direction of reproduction is applied to the spindle motor 102 until the pickup 105 moves to a target position for reproduction, and then CLV servo is carried out to control the driver 103 such that the disk 101 rotates at a constant velocity.

However, when it takes long for the pickup 105 to reach the target position, the rate of rotation of the spindle motor 102 continuously increases, and consequently, an accelerated mode in which the rate of rotation exceeds a prescribed rate of rotation occurs. A controller 108 detects the rate of rotation of the spindle motor 102 and determines the accelerated mode when a speed exceeding the prescribed speed is detected. If the accelerated mode is determined, the controller 108 applies a command for stopping reproduction to the CLV servo block 104 to protect the system. In addition, the controller 108 detects the rate of rotation of the spindle motor 102 to control the spindle motor 102 depending on the mode.

Accordingly, conventional technologies employ a brushless motor as the spindle motor 102 and generate a frequency generation (FG) signal proportional to the rate of rotation of the spindle motor using an FG signal generator, as shown in FIG. 2. In other words, a signal detected by a Hall device 201 within the brushless motor is converted into a pulse signal by a comparator 202 to generate an FG signal which is output to the controller 108.

This brushless motor is more expensive than a DC motor and the manufacturing process thereof is poor. When employing a DC motor as a spindle motor according to conventional technologies, since the DC motor does not have a Hall device, it cannot generate an FG signal for detecting the rate of rotation. Consequently, an additional FG signal generator must be employed. In this case, the costs increase and the manufacturing process is also poor due to the addition of an apparatus.

SUMMARY OF THE INVENTION

To solve the above problems, it is an object of the present invention to provide an apparatus and method for detecting the rate of rotation of a DC spindle motor without using an additional frequency generation (FG) signal generator while employing a DC motor as the spindle motor for a disk drive.

Additional objects and advantages of the invention will be set forth in part in the description which follows and, in part, will be obvious from the description, or may be learned by practice of the invention.

Accordingly, to achieve the above and other objects of the present invention, there is provided an apparatus for detecting a rate of rotation of a DC spindle motor. The apparatus includes a current-to-voltage converter which detects and converts a current proportional to a magnitude of a current supplied to the DC spindle motor into an analog voltage, an analog-to-digital converter which converts the analog voltage output from the current-to-voltage converter into a digital signal, and a controller which detects the rate of rotation of the DC spindle motor using the digital signal output from the analog-to-digital converter and controlling the DC spindle motor in accordance with the detected rate of rotation.

In another aspect, there is provided a method of detecting a rate of rotation of a DC spindle motor. The method includes: (a) detecting a current supplied to the DC spindle motor; (b) generating a digital signal proportional to the magnitude of current detected in the step (a); and (c) determining the rate of rotation of the DC spindle motor based on the digital signal and controlling the DC spindle motor according to the determined rate of rotation.

The step (b) includes: (b1) converting the current detected in the step (a) into an analog voltage; and (b2) converting the analog voltage obtained in the step (b1) into the digital signal.

BRIEF DESCRIPTION OF THE DRAWINGS

The above and other objects and advantages of the present invention will become more apparent by describing in detail a preferred embodiment thereof with reference to the attached drawings in which.

DETAILED DESCRIPTION OF THE INVENTION

Figure 1:
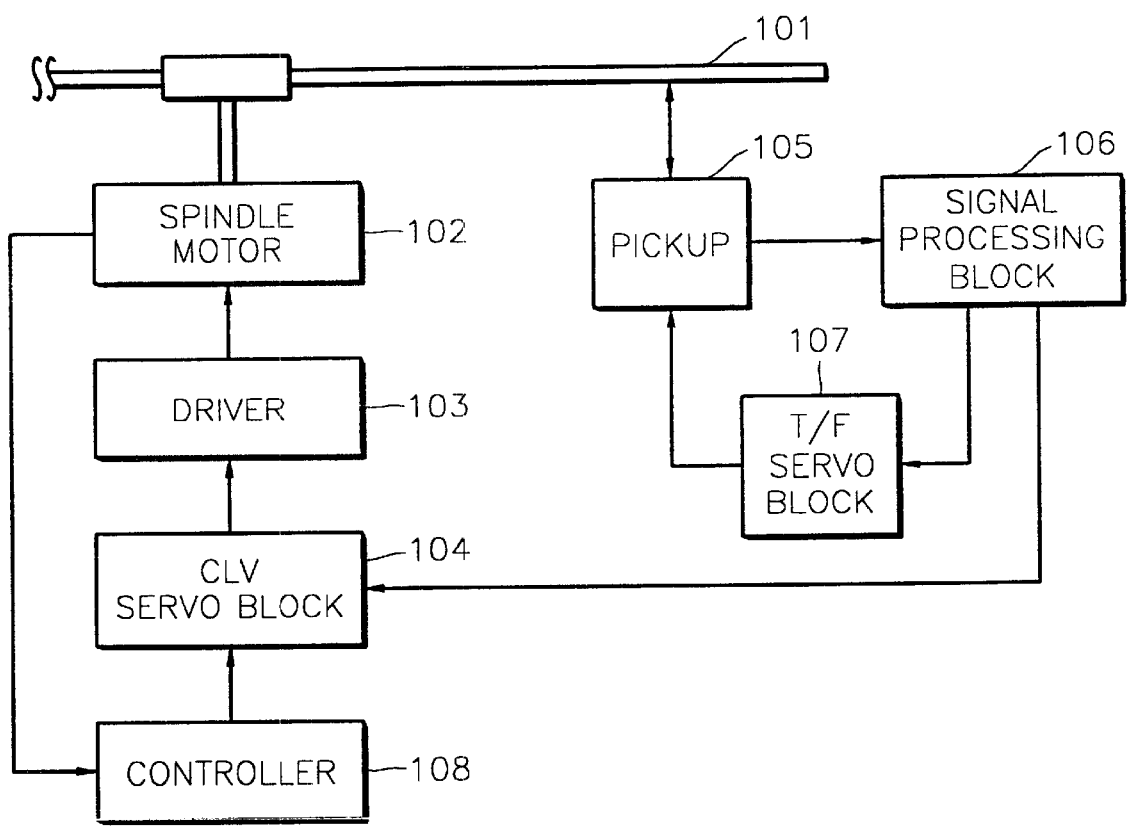
FIG. 1 shows a configuration of a general disk drive.
Figure 2:
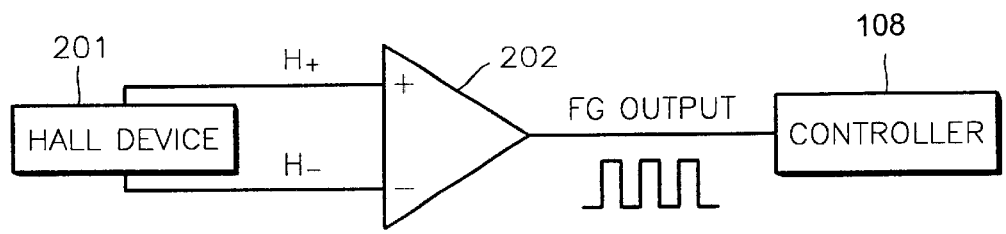
FIG. 2 show a configuration of a conventional frequency generation (FG) signal generator of a brushless motor.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
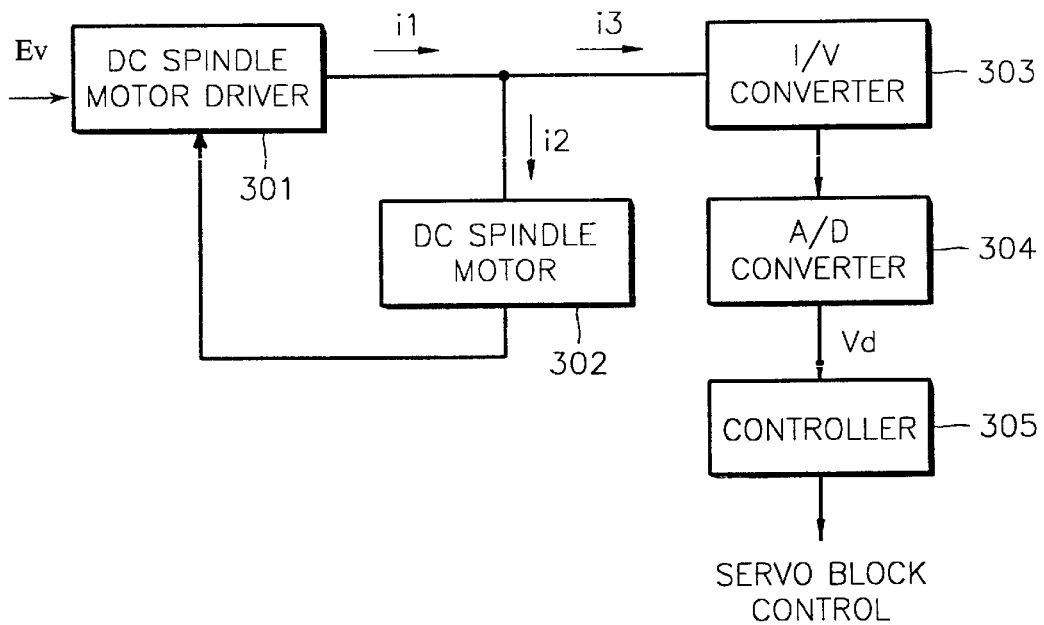
FIG. 3 shows a configuration of an apparatus for detecting a rate of rotation of a DC spindle motor according to an embodiment of the present invention.

As shown in FIG. 3, an apparatus for detecting the rate of rotation of a DC spindle motor according to the present invention includes a DC spindle motor driver 301, a DC spindle motor 302, a current-to-voltage (I/V) converter 303, an analog-to-digital (A/D) converter 304 and a controller 305. The DC spindle motor driver 301 receives an error voltage Ev from a servo block (not shown) of a disk drive and generates a driving current i1 for driving the DC spindle motor 302. The driving current i1 is divided and applied to the DC spindle motor 302 and the I/V converter 303. When an input impedance of the I/V converter 303 is preset considerably high in comparison with that of the DC spindle motor 302, a current i2 applied to the DC spindle motor 302 has a considerably larger value than a current i3 applied to the I/V converter 303. The value of the current i3 applied to the I/V converter 303 is relatively smaller than the value of the current i2 and is proportional to the magnitude of the current i1 applied from the DC spindle motor driver 301.

According to an aspect of the present invention, the I/V converter 303 is implemented such that it has a high input impedance and is connected in parallel to the DC spindle motor 302. However, the I/V converter 303 may be implemented such that it has a lower input impedance and is connected in series between the DC spindle motor driver 301 and the DC spindle motor 302.

Figure 4:
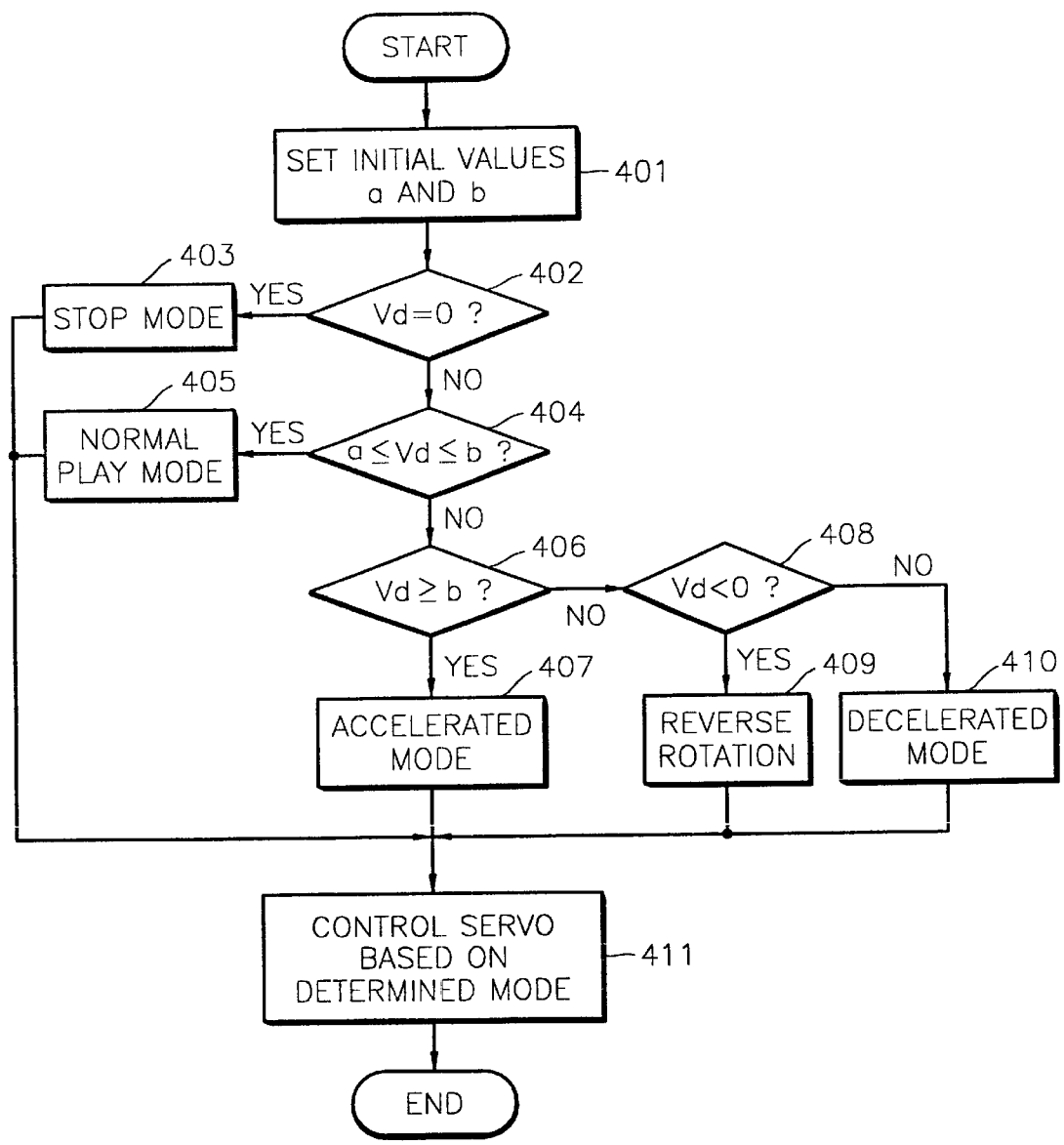
FIG. 4 is a flowchart showing a method of detecting the rate of rotation of a DC spindle motor according to the embodiments of the present invention.

The I/V converter 303 converts the input current i3 into a voltage. The A/D converter 304 converts the voltage output from the IV converter 303 into a digital signal Vd and outputs the digital signal Vd to the controller 305. The controller 305 detects the rate of rotation according to a method shown in FIG. 4 using the digital signal Vd and carries out servo control according to a result of the detection.

The controller 305 sets A/D converting values b and a corresponding to a maximum and a minimum rate of rotation at which the DC spindle motor 302 can normally rotate on the innermost and outermost circumferences of a disk, respectively, during a play mode in a servo method employing a CLV servo in step 401. The initial values a and b can be obtained through tests or simulation.

A determination is made as to whether the digital signal Vd is "0" in step 402. If it is determined that the digital value Vd is "0", since current supplied to the DC spindle motor 302 is "0", it is determined that the DC spindle motor 302 is in a stop mode in step 403.

If it is determined that the digital value Vd is not "0", a determination is made as to whether the digital signal Vd exists between the minimum value a and the maximum value b in step 404. If it is determined that the digital value Vd exists between the minimum and maximum values a and b, it is determined that the DC spindle motor 302 operates in a normal play mode in step 405.

On the other hand, if it is determined that the digital value Vd does not exist between the minimum and maximum values a and b, a determination is made as to whether the digital value Vd exceeds the maximum value b in step 406. If the digital value Vd exceeds the maximum value b, it is determined that the DC spindle motor 302 is in an accelerated mode in which the DC spindle motor 302 rotates faster than in the normal play mode in step 407.

If the digital value Vd is not between the minimum and maximum values a and b and does not exceed the maximum value b, a determination is made as to whether the digital value Vd is less than "0" in step 408. If the digital value Vd is less than "0", it is determined that the DC spindle motor 302 is rotating in reverse in step 409.

If the digital value Vd is not between the minimum and maximum values a and b and is less than the minimum value a but is not less than "0", since the digital signal Vd can be expressed as 0<Vd<a, it is determined that the DC spindle motor 302 is in a decelerated mode not in a normal play mode in step 410.

Therefore, the rate of rotation of the DC spindle motor 302 can be determined without using an additional frequency generation (FG) signal generator and the controller 305 performs servo control according to the determined mode in step 411. For example, when the accelerated mode is determined, the controller 305 converts a present mode into a stop mode to control the servo block in order to protect the DC spindle motor 302. When a decelerated mode is determined, the controller 305 controls a brake voltage of the DC spindle motor 302 to correspond to the value of the digital signal Vd.

Through the above operation, the value of a current flowing through the DC spindle motor 302 can be detected without adding an FG signal generator to the DC spindle motor 302 and the rate of rotation of the DC spindle motor can be determined based on the detected current value. According to the determined result, the DC spindle motor 302 and the servo block can be controlled.

As described above, the present invention detects the rate of rotation of a DC motor based on the current applied to the DC motor without using an additional FG signal generator in electronic equipment employing the DC motor and performs control corresponding to a detected result, thereby lowering costs and improving manufacturing process in comparison with the conventional method employing a brushless motor to detect the rate of rotation of a motor.

What is claimed is:

1. An apparatus for detecting a rate of rotation of a DC spindle motor which receives a current, the apparatus comprising:

a current-to-voltage converter which detects and converts a current proportional to a magnitude of the current supplied to the DC spindle motor into an analog voltage;

an analog-to-digital converter which converts the analog voltage output from the current-to-voltage converter into a digital signal; and a controller which detects the rate of rotation of the DC spindle motor using the digital signal output from the analog-to-digital converter and controls the DC spindle motor in accordance with the detected rate of rotation.

2. The apparatus of claim 1, wherein the current-to-voltage converter includes an input terminal divided from a driving current input terminal of the DC spindle motor and connected to the DC spindle motor in parallel.

3. The apparatus of claim 2, wherein an input impedance of the current-to-voltage converter is set higher than an input impedance of the DC spindle motor.

4. The apparatus of claim 1, wherein the current-to-voltage converter is connected to the DC spindle motor in series.

5. The apparatus of claim 4, wherein the input impedance of the current-to-voltage converter is set lower than an input impedance of the DC spindle motor.

6. The apparatus of claim 1, wherein the controller determines that the DC spindle motor is stopped when the digital signal is "0", that the DC spindle motor is rotating in a forward direction when the digital signal has a positive value, and that the DC spindle motor rotates in a reverse direction when the digital signal has a negative value, and controls an execution mode of the DC spindle motor according to the determined result.

7. The apparatus of claim 1, wherein the controller determines that the DC spindle motor is in an accelerated mode when the digital signal exceeds a maximum threshold of a normal rate of rotation and controls the DC spindle motor according to the determined result.

8. The apparatus of claim 1, wherein the controller determines that the DC spindle motor is in a decelerated mode when the digital signal is larger than "0" and less than a minimum threshold of a normal rate of rotation and controls a brake voltage of the DC spindle motor according to the value of the digital signal.

9. The apparatus of claim 1, wherein the controller determines that the DC spindle motor is in a reversed rotation mode when the digital signal is less than "0".

10. A method of detecting a rate of rotation of a DC spindle motor, the method comprising:

(a) detecting a current supplied to the DC spindle motor;

(b) generating a digital signal proportional to a magnitude of the current supplied to the DC motor; and (c) determining the rate of rotation of the DC spindle motor based on the digital signal and controlling the DC spindle motor according to the determined rate of rotation.

11. The method of claim 10, wherein the step (b) comprises:

(b1) converting a current proportional to the magnitude of the current supplied to the DC spindle motor into an analog voltage; and (b2) converting the analog voltage into the digital signal.

12. The method of claim 11, further comprising:

generating a spindle motor drive signal; and dividing the spindle motor drive signal into the current which is to be converted into the analog voltage and the current supplied to the DC spindle motor.

13. The method of claim 10, wherein the step (c) comprises:

determining the DC spindle motor to be stopped when the digital signal is "0", to be rotated in a forward direction when the digital signal has a positive value, and to be rotated in a reverse direction when the digital signal has a negative value; and controlling the DC spindle motor according to the determination whether the DC spindle is stopped, rotated in a forward direction or rotated in the reverse direction.

14. The method of claim 10, wherein the step (c) comprises:

determining the DC spindle motor to be in an accelerated mode when the digital signal exceeds a maximum threshold of a normal rate of rotation; and controlling the DC spindle motor according to the determination whether the DC spindle motor is in the accelerated mode.

15. The method of claim 10, wherein the step (c) comprises:

determining the DC spindle motor to be in a decelerated mode when the digital signal is larger than "0" and les s than a minimum threshold of a normal rate of rotation; and controlling a brake voltage of the DC spindle motor according to the determination whether the DC spindle motor is in the decelerated mode.

16. The method of claim 10, wherein the step (c) comprises:

determining the DC motor to be in a reverse direction mode when the digital signal is less than "0"; and controlling the DC spindle motor according to the determination whether the DC is in the reverse direction mode.

17. A method of controlling a DC spindle motor used for driving a disk, the method comprising:

determining a rate of rotation of the DC spindle motor without using a frequency signal generator; and controlling the DC spindle motor based upon the determined rate of rotation.

18. The method of claim 17, wherein the determining of the rate of rotation of the DC spindle motor comprises:

generating a spindle motor drive signal used for driving the DC spindle motor; and determining the rate of rotation of the DC spindle motor based upon the spindle motor drive signal.

19. The method of claim 18, wherein the determining of the rate of rotation of the DC spindle motor based upon the spindle motor drive signal comprises:

converting a current proportional to a magnitude of the spindle motor drive signal to a digital voltage signal; and determining the rate of rotation of the DC spindle motor based upon the digital voltage signal.

20. The method of claim 19, wherein the converting of the current proportional to the magnitude of the spindle motor drive signal comprises:

dividing the spindle motor drive signal into the current proportional to the magnitude of the spindle motor drive signal and a current supplied to the DC spindle motor.

21. The method of claim 19, wherein the converting of the current proportional to the magnitude of the spindle motor drive signal comprises:

converting the DC spindle motor signal to the digital voltage signal and transmitting the the spindle motor drive signal to the DC spindle motor.

22. The method of claim 19, wherein the determining of the rate of rotation of the DC spindle motor based upon the digital voltage signal comprises:

determining whether the digital voltage signal is between two preset values, and maintaining the spindle motor drive signal if the digital voltage signal is between the two preset values;

determining whether the digital voltage signal is greater than a higher one of the two preset values if the digital voltage signal is determined to not be between the two preset values, stopping the DC spindle motor if the digital voltage signal is determined to be greater than the higher one of the two preset values, determining whether the digital voltage signal is less than "0" if the digital voltage signal is determined not to be less greater than the higher one of the two preset values, controlling a brake voltage of the DC spindle motor to correspond to the digital voltage signal if the digital voltage signal is less than "0".

23. An apparatus for controlling a DC spindle motor used for a disk, comprising:

a DC spindle motor driver to generate a DC spindle motor drive current signal used for driving the DC spindle motor; and a control unit to determine a voltage signal based upon the DC spindle motor drive current signal, and to control the DC spindle motor based upon the voltage signal.

24. The apparatus of claim 23, wherein the apparatus does not include a frequency generation signal generator.

25. The apparatus of claim 23, wherein the control unit comprises:

a converter to convert at least a portion of the DC spindle motor drive current signal to the voltage signal which is digital; and a controller to detect a rate of rotation of the DC spindle motor using the digital voltage signal, and controls the DC spindle motor based upon the detected rate of rotation.

26. The apparatus of claim 25, wherein the converter and the DC spindle motor are connected in parallel with respect to the DC spindle motor driver, so that the converter receives the portion of the DC spindle motor drive signal and the DC spindle motor receives the remaining portion of the DC spindle motor drive signal.

27. The apparatus of claim 26, wherein the converter has a higher input impedance than that of the DC spindle motor.

28. The apparatus of claim 25, wherein the converter comprises:

a current-to-voltage converter to convert the portion of the of the DC spindle motor drive signal to an analog voltage signal; and an analog-to-digital converter to convert the analog voltage signal to the digital voltage signal;

wherein the current-to-voltage converter and the DC spindle motor are connected in parallel with respect to the DC spindle motor driver, so that the current-to-voltage converter receives the portion of the DC spindle motor drive signal and the DC spindle motor receives the remaining portion of the DC spindle motor drive signal.

29. The apparatus of claim 28, wherein the current-to-voltage converter has a higher input impedance than that of the DC spindle motor.

30. The apparatus of claim 25, wherein the converter is connected between and in series with the DC spindle motor driver and the DC spindle motor.

31. The apparatus of claim 30, wherein the converter has a lower input impedance than that of the DC spindle motor.

32. The apparatus of claim 25, wherein the converter comprises:

a current-to-voltage converter to convert the portion of the of the DC spindle motor drive signal to an analog voltage signal; and an analog-to-digital converter to convert the analog voltage signal to the digital voltage signal;

wherein the current-to-voltage converter is connected between and in series with the DC spindle motor driver and the DC spindle motor.

33. The apparatus of claim 32, wherein the current-to-voltage converter has a lower input impedance than that of the DC spindle motor.

34. An apparatus for controlling a spindle motor used for rotating a disk, comprising:

a spindle motor driver to generate a spindle motor drive current signal used for driving the spindle motor; and a control unit to determine a voltage signal based upon the spindle motor drive current signal, and to control the spindle motor based upon the voltage signal;

wherein the apparatus does not include a frequency generation signal generator.

* * * * *